Jan. 31, 1961   F. U. SULMER   2,969,683
GYRO ERECTION CUT-OUT METHOD
Filed July 1, 1959

WITNESSES
Edwin G. Bassler
D. J. Straitiff

INVENTOR
Fred U. Sulmer
BY R.M.Brodahl
ATTORNEY

United States Patent Office 2,969,683
Patented Jan. 31, 1961

2,969,683

GYRO ERECTION CUT-OUT METHOD

Fred U. Sulmer, Baltimore, Md., assignor to Westinghouse Electric Corporation, East Pittsburgh, Pa., a corporation of Pennsylvania Filed July 1, 1959, Ser. No. 824,310

3 Claims. (Cl. 74—5.41)

The present invention relates to a gyro erection cutout method, and more particularly to a method for controlling the erection of a gyro at a time when such gyro may be subjected to acceleration forces.

A vertical gyro is provided with means for alignment of the spin axis of the gyro with the local vertical direction. This alignment, known as the spin axis erection, must be done initially when the gyro is first activated, and thereafter periodically or continuously to eliminate gyro drift errors, earth rotation errors and errors caused by the gyro's motion relative to earth.

In gyro erection systems heretofore employed, such systems employ a device for sensing the local vertical direction. This device acts as an intelligence source and detects displacement of the gyro spin axis relative to the direction of gravity. The intelligence is fed to precession motors, also known as torquers, which drive the gyro gimbal elements and in turn position the spin axis to be parallel to the direction of gravity.

The sensing device which is a gravity-sensing element or a vertical reference mechanism, is pendulous in nature. If the erection signals are not cut out during maneuvers of the aircraft or vehicle employing such an erection system, a gyro error will result because of the automatic erection of the gyro's spin axis to the false vertical sensed by the erection mechanism.

Heretofore, no known device or method has been provided for distinguishing between the forces due to vehicle acceleration irrespective of direction and that due to gravity. For this reason, previous conventional erection sensors were not immune to false erection of the gyro in the presence of translational accelerations to which the gyro may be subjected from various directions. Rotational accelerations will not cause any errors in the verticality of the gyro.

From the foregoing, it will be apparent that an improved method of controlling gyro erection without influence by acceleration of the vehicle in any direction is needed, and accordingly, it is a prime object of the present invention to provide such an improved method.

Figure 1:
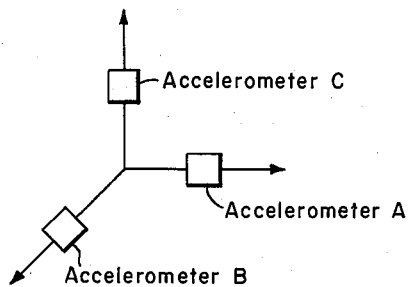
Figure 2:
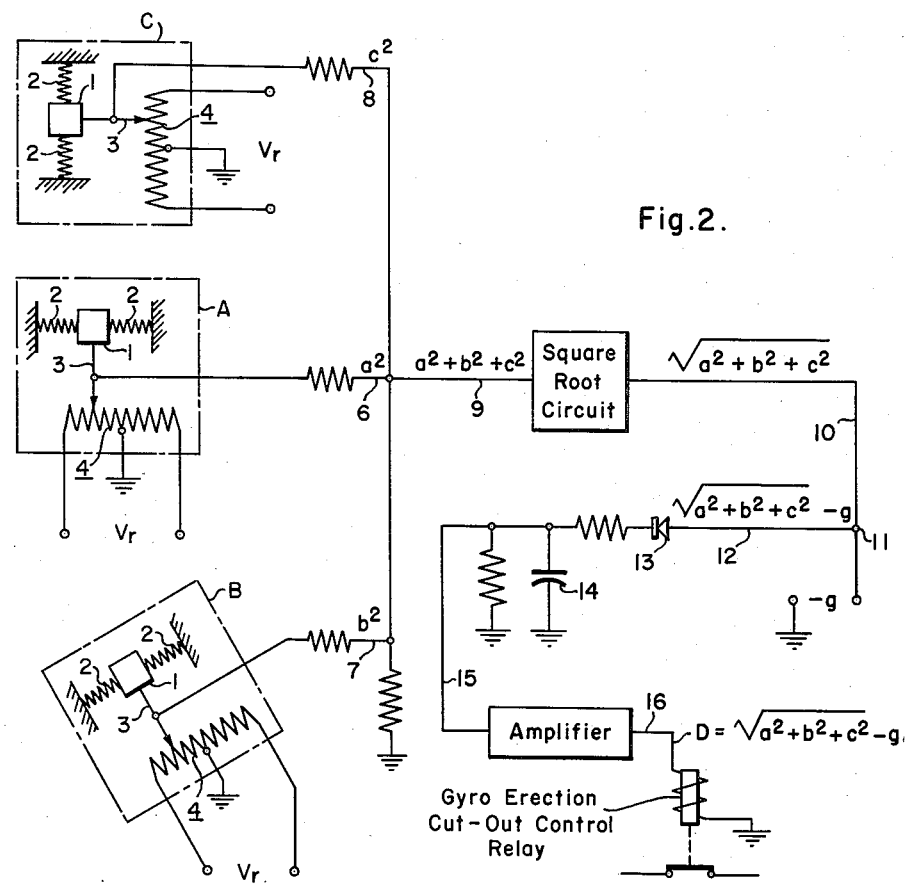

Other objects and advantages of the invention will become apparent from the following detailed description of such invention when taken in connection with the accompanying drawing, in which:

Fig. 1 illustrates an arrangement of three accelerometers employed in the novel method according to the present invention; and, Fig. 2 illustrates schematically a system embodying the three accelerometers of Fig. 1. in a manner for performing the novel method of the present invention.

Description

According to the novel method of the present invention, intelligence is rendered available to indicate that the gyro is subjected to accelerations other than gravity, such intelligence being utilized in the present method for preventing erection of the gyro at a time when such accelerations exist.

The present method employs three accelerometers oriented in space along three mutually perpendicular axes or directions, Fig. 1, whereby such system of accelerometers will detect all accelerations to which it is subjected, since any vector in space can be resolved into three or less components which are mutually perpendicular. This is true independent of the orientation of the axes in space.

The outputs of the three mutually perpendicular accelerometers are voltage signals which represent the magnitude of the acceleration vectors, including gravity, along their corresponding axes. For sake of analysis, these voltage signals may be referred to as $a$, $b$, and $c$, respectively. The resultant magnitude of the total acceleration to which the system is subjected may be found by taking the vector sum of the magnitude of these voltage signals. This may be expressed as $$R = \sqrt{a^2 + b^2 + c^2}$$

where $R$ = a vector summation signal voltage proportional to the magnitude of the resultant acceleration force.

If this system is subjected to the acceleration of gravity alone, then $\sqrt{a^2 + b^2 + c^2} = g$, where $g$ = a voltage signal proportional to the magnitude of the acceleration of gravity.

Since the objective of the present method is to prevent erection of a gyro when same is subjected to an acceleration other than gravity, in accord with the present method, it is sufficient to ascertain that such an acceleration is present without concern for the direction of the vector of the acceleration force.

Therefore, if $g$ is not equal to $\sqrt{a^2 + b^2 + c^2}$ we can conclude that the system is subjected to a force due to an acceleration in addition to that caused by gravity.

In employing the present method of gyro erection cutout control, the following simple equation is mechanized:

$$\sqrt{a^2 + b^2 + c^2} - g = D$$

where D is defined as a difference voltage signal proportional to the difference between the forces due to accelerations and that due to gravity. If $D \neq 0$ the system is subjected to an outside acceleration force other than that due to gravity.

The difference voltage signal is then applied to a gyro erection cut-out control switch which responds to interrupt gyro erection. Sensitivity of this cut out control may be adjusted according to the degree of false vertical that may be tolerated. In most applications, employing the above method, erection cut-out is achieved whenever an effective difference voltage signal exists. Sensitivity of the system may be improved by amplification of such difference voltage signal.

For one possible mechanization to obtain the novel method of gyro erection cut-out control, reference may be made to the showing in Fig. 2 of the drawing. For sake of illustration, the three mutually perpendicular accelerometers A, B, C of Fig. 1, will each essentially comprise a respective mass 1 which is suspended by spring means 2 and oriented for deflection respective to orientation of the accelerometer embodying same. Each of the masses 1 is operatively connected to a respective movable contact 3 of a respective potentiometer 4 having a reference voltage $V_r$ applied thereto and which may be wound so as to provide an output voltage at movable contact 3 which varies as the square of the displacement of the mass 1. The electrical outputs from the accelerometers A, B, C, appear as signals $a^2$, $b^2$, $c^2$ in lines 6, 7 and 8 in Fig. 2, and these signals are summed by junction of lines 6, 7 and 8 with a wire 9 common to each. From wire 9 the summation signal $a^2 + b^2 + c^2$ may be fed to a square root circuit, such for example as disclosed and described in pages 273 and 274 in "Electron-Tube Circuits," by Samuel Seeley, published by McGraw-Hill Book Company, Inc. Output from the square root circuit then appears at line 10 as $\sqrt{a^2+b^2+c^2}$ which constitutes the vector summation signal R referred to hereinbefore. The gravity voltage signal in negative form, $-g$, is then added at junction 11 to provide a signal equal to $\sqrt{a^2+b^2+c^2}-g$, or the difference voltage signal D, at 12 which, if necessary, is rectified at 13, filtered at 14, and fed to an amplifier via 15, thence to the control winding of a gyro erection cut-out control relay at 16 where such amplified difference voltage signal appears in direct current form as $\sqrt{a^2+b^2+c^2}-g$. The $-g$ signal fed to the circuit junction 11 will be of such value as to cancel out the signal at 10 when the accelerometers A, B, C are subjected to no acceleration forces other than that of gravity.

Without departing from the spirit and scope of the invention it will be apparent that the accelerometers A, B, C as shown in Fig. 2 may be replaced by accelerometers whose outputs vary in direct proportion to deflection of their respective masses 1 and these outputs then would be fed to such as diode shaping networks which would effect the squaring of such outputs to provide the $a^2$, $b^2$ and $c^2$ signals. The mechanization might also be in the form of one which provides a direct current output, in which case rectification at 13 and filtering at 14 would not be necessary.

In all cases it is desirable that all reference voltages such as $V_r$ and $-g$ be obtained from the same voltage source to eliminate regulation inaccuracies.

While the invention has been described with some detail, it will be obvious to those skilled in the art that it is not necessarily so limited but is susceptible of various changes and modifications without departing from the invention as defined in the following claims.

I claim as my invention:

1. A method of controlling erection of the spin-axis-defining-means of a gyro whereby erection is prevented at a time when such gyro may be subjected to acceleration forces other than gravity, irrespective of the direction of such acceleration forces, said method comprising the steps of deriving three signals representative of the magnitudes of respective acceleration force vectors along three mutually-perpendicular directions, deriving a vector summation signal representative of the vector sum of the aforesaid three signals, deriving a gravity signal representative of the force of gravity, deriving a difference signal representing the difference between the vector summation signal and the gravity signal, and controlling a gyro erection cut-out control means according to said difference signal.

2. A method of controlling the erection of the spin-axis-defining-means of a gyro whereby erection is prevented at a time when such gyro may be subjected to acceleration forces other than gravity, irrespective of the direction of such acceleration forces, said method comprising the steps of deriving three signals representative of the square of the respective accelerating forces along three mutually-perpendicular directions to which the gyro is subjected, deriving a summation signal representative of the summation of said signals, deriving a vector summation signal representative of the square root of said summation signal, deriving a gravity signal representative of the force of gravity, deriving a difference signal representing the difference between said vector summation signal and said gravity signal, deriving an amplified difference signal, and controlling a gyro erection cut-out control means by said amplified difference signal.

3. A method of controlling the erection of the spin-axis-defining-means of a gyro, comprising the steps of sensing the acceleration forces to which the gyro is subjected respective to three mutually-perpendicular directions, deriving respective voltage signals proportionate to the square of the magnitude of said acceleration forces, deriving a voltage summation signal proportionate to the summation of said voltage signals, deriving an electrical vector summation signal proportionate to the square root of said voltage summation signal, deriving an electrical reference signal representative of force of gravity, deriving a difference signal proportionate to the difference between said vector summation signal and said reference signal, and controlling gyro erection cut-out control switch means by said difference signal to prevent the aforesaid erection when said gyro is subjected to acceleration forces other than gravity.

References Cited in the file of this patent

UNITED STATES PATENTS

| | | |
|---|---|---|
| 2,678,564 | Douglas et al. | May 18, 1954 |
| 2,699,681 | Johnson | Jan. 18, 1955 |